United States Patent
Reial et al.

(10) Patent No.: US 10,111,194 B2
(45) Date of Patent: Oct. 23, 2018

(54) TRANSMISSION AND RECEPTION OF CONTROL SIGNALS COMPRISING CONTROL INFORMATION

(71) Applicant: Telefonaktiebolaget LM Ericsson (publ), Stockholm (SE)

(72) Inventors: Andres Reial, Malmo (SE); Jose Luis Pradas, Stockholm (SE); Johan Rune, Lidingo (SE); Torgny Palenius, Barseback (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/322,427

(22) PCT Filed: May 18, 2016

(86) PCT No.: PCT/EP2016/061132
§ 371 (c)(1),
(2) Date: Dec. 27, 2016

(87) PCT Pub. No.: WO2017/198295
PCT Pub. Date: Nov. 23, 2017

(65) Prior Publication Data
US 2018/0098295 A1    Apr. 5, 2018

(51) Int. Cl.
*H04J 3/06* (2006.01)
*H04W 56/00* (2009.01)
(Continued)

(52) U.S. Cl.
CPC ....... *H04W 56/0015* (2013.01); *H04W 48/12* (2013.01); *H04W 72/042* (2013.01); *H04W 74/006* (2013.01)

(58) Field of Classification Search
CPC ........... H04W 56/0015; H04W 74/006; H04W 72/042; H04W 48/12
See application file for complete search history.

(56) References Cited

U.S. PATENT DOCUMENTS 8,565,807 B2 * 10/2013 Michel ................. H04W 24/02
370/315
2012/0252451 A1    10/2012 Knauft et al.

FOREIGN PATENT DOCUMENTS

WO    2013077783 A1    5/2013
WO    2015028081 A1    3/2015

OTHER PUBLICATIONS

PCT International Search Report, dated Feb. 15, 2017, in connection with International Application No. PCT/EP2016/061132, all pages.

(Continued)

*Primary Examiner* — Afshawn M Towfighi
(74) *Attorney, Agent, or Firm* — Leffler Intellectual Property Law, PLLC

(57) ABSTRACT

The disclosure relates to methods, devices, and computer programs in mobile communications. More specifically, the proposed technique relates to broadcasting and receiving transmitting control information for supporting system access or system monitoring. In particular the disclosure relates a method, performed in a network node, for transmitting control information for supporting system access or system monitoring. The method comprises obtaining a timing of a first control signal comprising the control information and evaluating whether a first synchronization signal associated with a previously configured second control signal can also be used to provide synchronization between a receiving wireless device and the network node at reception of the control information. The method comprises, when the evaluation is negative then, transmitting a second synchronization signal configured to provide synchronization between a receiving wireless device and the network node at reception of the first control signal, and transmitting the first control signal.

50 Claims, 9 Drawing Sheets

(51) Int. Cl.
*H04W 72/04* (2009.01)
*H04W 48/12* (2009.01)
*H04W 74/00* (2009.01)

(56) References Cited

OTHER PUBLICATIONS

PCT Written Opinion, dated Feb. 15, 2017, in connection with International Application No. PCT/EP2016/061132, all pages.
Ali T. Koc et al., Device Power Saving and Latency Optimization in LTE-A Networks Through DRX Configuration, IEEE Transactions on Wireless Communications, vol. 13, No. 5, May 2014, pp. 2614-2625.

* cited by examiner

TRANSMISSION AND RECEPTION OF CONTROL SIGNALS COMPRISING CONTROL INFORMATION

TECHNICAL FIELD

The disclosure relates to methods, devices, and computer programs in mobile communications. More specifically, the proposed technique relates to control information for supporting system access or system monitoring. In particular the disclosure relates to providing synchronization for control signals comprising control information.

BACKGROUND

The 3rd Generation Partnership Project, 3GPP, is responsible for the standardization of the Universal Mobile Telecommunication System, UNITS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, or an access point is a general term for a radio network node capable of transmitting radio signals to a UE and receiving signals transmitted by a UE. In Wireless Local Area Network, WLAN, systems the wireless device is also denoted as a Station, STA.

In the future communication networks, also referred to as the 5th generation mobile networks, there will be evolvement of the current LTE system to the so called 5G system. The main task for 5G is to improve throughput and capacity compared to LTE. This is in part to be achieved by increasing the sample rate and bandwidth per carrier. 5G is also focusing on use of higher carrier frequencies i.e., above 5-10 GHz.

In LTE, "tracking" is a functionality which supports locating the UE. The network is broken down into Tracking Areas, TA. The network configures a UE with one or more tracking areas. This allows the network to locate the UE within a certain defined region. When the UE enters one tracking area which is not in the list provided by the network, the UE performs a tracking area update. This update assists the network to update the UE location information. In LTE the tracking area is indicated via the system information, SI, which is regularly broadcasted in the cells.

The 5G concept does not use the LTE system information, SI, concept. Instead, a new concept "System Control Plane, SCP" is introduced to enhance the functionality. The SCP concept is based on a node transmitting a System Signature Index, SSI, which points to an entry in the Access Information Table, AIT. The AIT is a collection of the different system information configurations. These configurations should only carry, in principle, information related to the network access e.g. random access parameters. In other words, the AIT should not contain any location information.

To support dormant mode mobility and paging, the 5G concept includes a separate "tracking Radio Access Network, RAN, area", TRA, entity with associated signals to convey the TRA identity. The signal must be detected by wireless devices waking up from sleep after potentially long DRX periods and carry information about the tracking area identity and system frame timing, estimated 30-40 bits. Subsequently the wireless device might need to detect other control signals used in the initial access procedure, where the same support for synchronization as for TRA reception is required.

There is thus a need for providing sync support for control signals that does not incur unnecessary overhead associated with coarse synchronization.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a method, performed in a network node, for transmitting control information for supporting system access or system monitoring. The method comprises obtaining a timing of a first control signal comprising the control information and evaluating whether a first synchronization signal associated with a previously configured second control signal can also be used to provide synchronization between a receiving wireless device and the network node at reception of the control information. The method further comprises, when the evaluation is negative, then transmitting a second synchronization signal configured to provide synchronization between a receiving wireless device and the network node at reception of the first control signal, and transmitting the first control signal. By investigating whether a previously configured synchronization signal can be used, the first control signal may be transmitted without unnecessary duplication of synchronization support overhead in deployments where synchronization is already provided by other signals.

According to some aspects, the first synchronization signal and the second synchronization signal are selected from a set comprising a number of constituent sequences, wherein a subset of the sequences are reserved for the second synchronization signal and are exclusively used for synchronization of the first control signal. The control signal design according to the proposed method allows efficient, low-overhead wireless device processing.

According to some aspects, the disclosure relates to method, performed in a wireless device for receiving control information for supporting system access or system monitoring from a network node. The method comprises receiving a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of a first control signal, detecting one reference sequences from the set of synchronization signal sequences, in the received synchronization signal and receiving, upon successful detection, the first control signal transmitted by the network node, using the received synchronization signal to provide synchronization between the wireless device and the network node. Hence, a wireless device may with a small complexity impact obtain synchronization.

According to some aspects, a subset of the synchronization signals sequences are associated with a previously configured second control signal. Hence, a wireless device may blindly and with a small complexity impact obtain synchronization for control signal reception, no matter which signals provide the synchronization in a given deployment or part of the network.

According to some aspects, the disclosure relates to a network node, in a communication system being configured for transmitting control information for supporting system access or system monitoring to a wireless device. The network node comprises a radio communication interface radio circuitry configured for communication with the wireless device; and processing circuitry configured to cause the network node to obtain a timing of a first control signal comprising the control information and to evaluate whether a first synchronization signal associated with a previously configured second control signal can also be used to provide synchronization between the wireless device and the network node at reception of the first control signal. The processing circuitry is further configured to, when the evaluation is negative, cause the network node transmit a second synchronization signal configured to provide synchronization between the wireless device and the network node at reception of the first control signal, using the radio communication interface and to transmit the first control signal using the radio communication interface.

According to some aspects, the disclosure relates to wireless device configured for receiving control information for supporting system access or system monitoring from a network node. The wireless device comprises a radio communication interface configured to communicate with the network node and processing circuitry. The processing circuitry is configured to cause the wireless device to receive, using the radio communication interface, a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of the first control signal. The processing circuitry is further configured to cause the wireless device to detect one reference sequence from the set of synchronization signal sequences, and to receive, upon successful detection, the first control signal transmitted by the network node, using the radio communication interface, and to use the received synchronization signal to provide synchronization between the wireless device and the network node.

According to some aspects, the disclosure relates to a computer program comprising computer program code which, when executed, causes a network node or wireless device to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
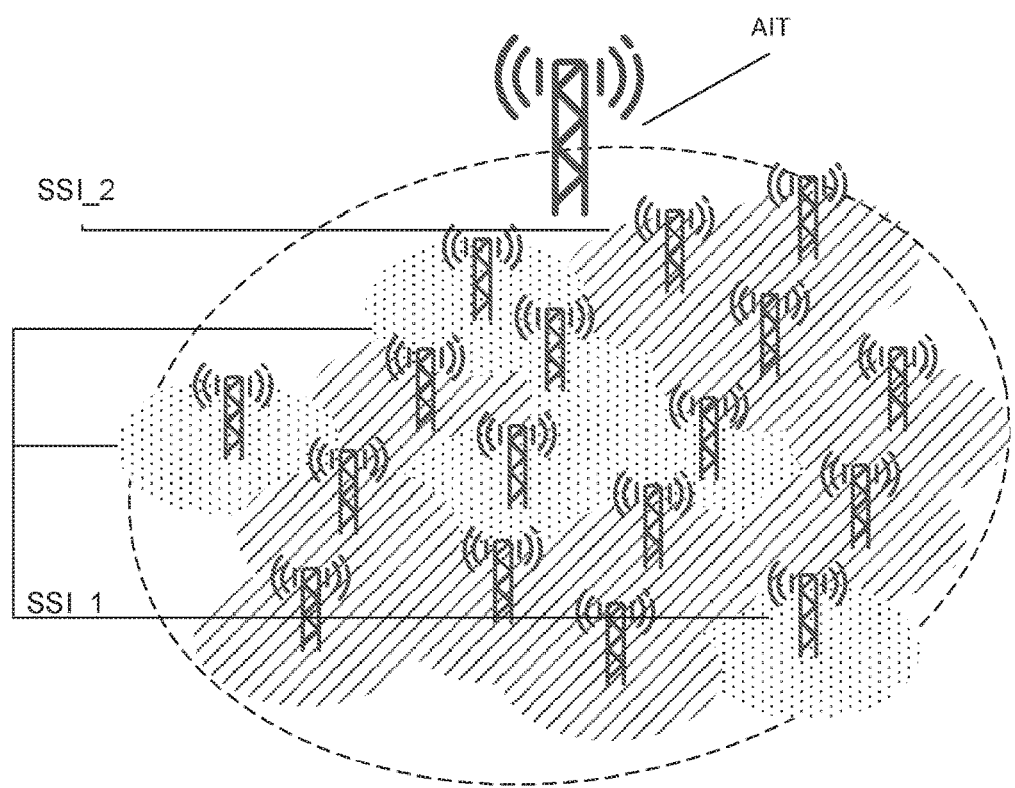
FIG. 1 depicts a set of nodes, wherein a subset of them is transmitting a first SSI and another subset is transmitting a second SSI.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

A proposed concept for a future 5G implementation is not to use the LTE system information concept. In contrast the 5G system uses a new system control plane containing the minimum system information parameters which allow the wireless device to access the network.

This introduces a need for new signals e.g. signals for transmitting location information, which are needed to enable a more efficient paging mechanism. A prerequisite for a single self-contained location information signal is that the signal also needs to allow the acquisition of coarse symbol timing and frequency synchronization for wireless devices that wake up from a deep sleep state, or other energy-saving state. Such signal structures incur a significant overhead on top of the payload, an overhead that in many (though not all) deployments may be duplicating similar features already available in control plane access signals. The need for acquisition of coarse symbol timing and frequency synchronization is also present for other types of control signals used during system setup and associated with system information, such as paging requests or Random Access Channel, RACK, responses.

This disclosure proposes methods to provide synchronization for control signals, that does not incur unnecessary overhead associated with additional coarse synchronization signals. The main concept is to monitor the system control plane for previously configured signals that would be usable for synchronization. If a suitable signal is already configured, then it is used for synchronization. Otherwise a new synchronization signal is configured for the specific purpose.

For better understanding of the proposed techniques the future 5G concept will now be presented. Note that the 5G system is not yet standardized, so the description is based on concepts being presented and discussed by involved parties. In this disclosure Tracking Area Signals, TRAS, will be used as an example to explain the proposed methods. However, it must be understood that the same concept is generally applicable to any control plane signal with coarse symbol timing and frequency synchronization requirements.

The new concept, also referred to as the System Control Plane, SCP, have been introduced to enhance the functionality. The SCP concept is based on a node transmitting a System Signature Index, SSI, which points to an entry in the Access Information Table, AIT. The AIT is a collection of the different system information configurations that are used within a given area, which may be an entire Public Land Mobile Network, PLMN, or a region in a PLMN. These configurations should only carry, in principle, information related to the network access (e.g. random access parameters). The system information distribution aspect of the 5G concept is illustrated in FIG. 1. FIG. 1 depicts a set of nodes, one subset of them transmitting SSI_1 and another subset transmitting SSI_2. Yet, another node, in a macro area, distributes the AIT which contains the random access parameters to access SSI_1 and SSI_2.

The SSI is transmitted using a Synchronization Signal, SS, which consists of a symbol timing synchronization and coarse frequency synchronization component, and an SSI index carrying component. The two parts are similar to the PSS and SSS in LTE respectively. The first part is selected from a small number of options and is designed to provide good auto- and cross-correlation properties. The second one embeds the SSI index using sequence modulation, interleaving several constituent sequences and supporting a search space of hundreds of indices. The SS within this disclosure refers to this particular synchronization signal.

For the easier understanding of the suggested approach, the proposed technique will be detailed in the context of tracking area information. However, as will be given by some examples thereafter, the approach is equally applicable to other control signals e.g. during system setup.

In LTE, "tracking" is a functionality which supports locating the UE. The network is broken down into Tracking Areas, TRA. The network configures a UE with one or more tracking areas. This allows the network to locate the UE within a certain defined region. In 5G it must also be possible for one or more wireless devices or wireless device groups to be paged for the purposes of ordering network access, distributing emergency messages, etc.

Figure 2:
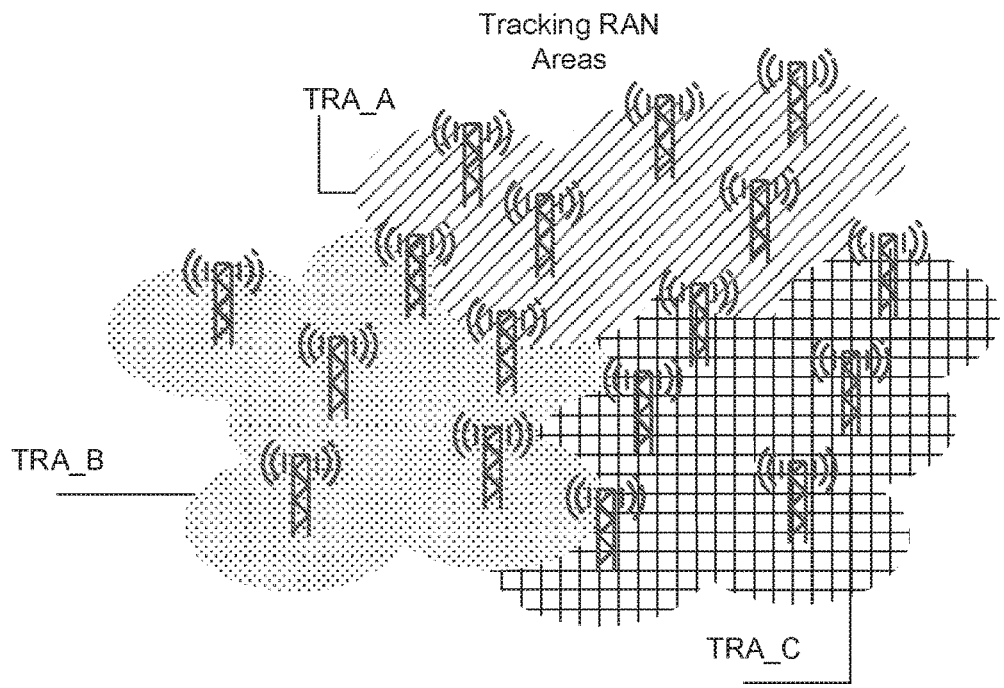
FIG. 2 depicts different tracking areas in a communication system.

Hence, TRA information is also needed to enable a more efficient paging mechanism. When the wireless device enters one tracking area which is not in the list provided by the network, the wireless device performs a tracking area update. This update assists the network to update the wireless device location information. FIG. 2 depicts different TRAs (A to C).

In LTE tracking areas are indicated via system information. In LTE, the Tracking Area Code, TAC, is contained in System Information Block Type 1, SIB1. Therefore, the system information is location dependent i.e. it includes location information.

An issue is related to the SCP concept is that the AIT, Access Information Table, contains the minimum system information parameters which allow the wireless device to access the network. The AIT is neither dimensioned to carry thousands of bits nor dimensioned to be transmitted often. In other words, the AIT should not contain any location information. Two nodes having exactly the same SSI do not necessarily need to belong to the same tracking area (See FIG. 1 and FIG. 2). In FIG. 1, it can be observed that SSI_1 is used by different nodes which belong to different Tracking Areas. This leads to a location uncertainty based on SSI alone—the network does not know where the wireless device is and the wireless device does not know whether it is reachable.

Hence, to avoid expanding (in essence, multiply) the system information volume, the SSI and AIT are not tied to, and will not include, location-related information. To support dormant mode mobility and paging, the 5G concept includes a separate "tracking RAN area", TRA, entity with associated signals to convey the TRA identity. The signal must be detected by wireless devices waking up from sleep after potentially long DRX periods and carry information about the tracking area identity and system frame timing, estimated 30-40 bits, A straightforward approach for Tracking RAN Area Signal, TRAS, and design would be to embed the TRA information using a sequence modulation method, reminiscent of the LTE Primary Synchronization Signal, PSS/Secondary Synchronization signal, SSS, design. However, such design would significantly limit the payload size (to around 10-12) bits due to the exponential growth of the number of sequences for the wireless device to test as the message length increases.

A pre-requisite for a single self-contained TRA signal is that the signal also needs to allow the acquisition of coarse symbol timing and frequency synchronization for wireless devices that wake up from deep sleep. Thus, the starting point for TRA design is that the TRA signal is transmitted in two individually configured parts: a conventional payload signal with associated DMRS, which is preceded immediately by a synchronization signal that allows sufficient time and frequency synchronization for payload reception.

Such signal structures generally incur a significant overhead on top of the payload, an overhead that in many (though not all) deployments may be duplicating similar features already available in control plane access signals. There is thus a need for a TRA signal design that allows conveying sufficient TRA information payloads and does not incur unnecessary overhead associated with coarse synchronization.

This disclosure proposes that in deployments, or in specific nodes or network layers, where SSI is transmitted from the same nodes as the TRAS, and the timing and period of SSI is suitable for the TRAS transmission, no dedicated TRA synchronization signal is configured. Instead, Synchronisation Signal, SS (i.e. SS associated with SSI) is used for synchronization and the TRA info field is transmitted over the standard downlink control or shared data channel shortly thereafter.

If no suitable SSI (and hence no SS) is available (e.g. the TRA node is not transmitting SSI, or the timing or period of the SSI does not match the preferred timing or period of TRAS), the TRA synchronization is provided by configuring a separate synchronization signal, the TRA Synchronization Signal, TRASS. The TRASS is preferably implemented as one or a small number of reserved sequences from the Synchronization Signal, SS, design.

A similar concept may be used for other control signals than the TRAS, e.g. in the initial access procedure. The "baseline" sync for those signals is still the SSI described above. If it is there, it is used. If not, another sync signal is configured. Some specific signals that could use this approach for attaching sync are the tracking area, paging, random access response, and probably more.

The proposed technique will now be described in further detail using Tracking Area Signals, TRAS, as an example.

Broadcasting the tracking area index is a non device-specific operation that is active whenever a wireless device may be present in the given geographical area. The Tracking Area, TRA, signal should carry at least identification for the tracking RAN area. In addition, other information such as timing reference information (e.g. a System Frame Number) could be added. It is currently estimated to occupy 30-40 bits is an area index and timing reference information is included. The TRA information will be transmitted as coded information payload (TRAS Index, TRASI) with associated reference symbols to be used as phase reference. Traditional demodulation and decoding is then used by the wireless device to extract the information.

In the Dormant State, prior to each instance of reading the TRA information, the wireless devices are often in a low-power DRX state and exhibit a considerable timing and frequency uncertainty. The TRA signal must therefore also contain, or be associated with, a synchronization field that allows the wireless device to obtain time and frequency synchronization for subsequent payload reception. The synchronization field must satisfy certain minimum time/frequency span constraints to enable sufficient synchronization precision in frequency and time respectively.

The proposed technique enables control information, for supporting system access or system monitoring and providing, to be transmitted, such that synchronization support is provided without unnecessary addition of synchronization signals.

The proposed methods will now be described in more detail referring to FIGS. 3 and 5. It should be appreciated that FIGS. 3 and 5 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Example Operations in a Network Node

Figure 3:
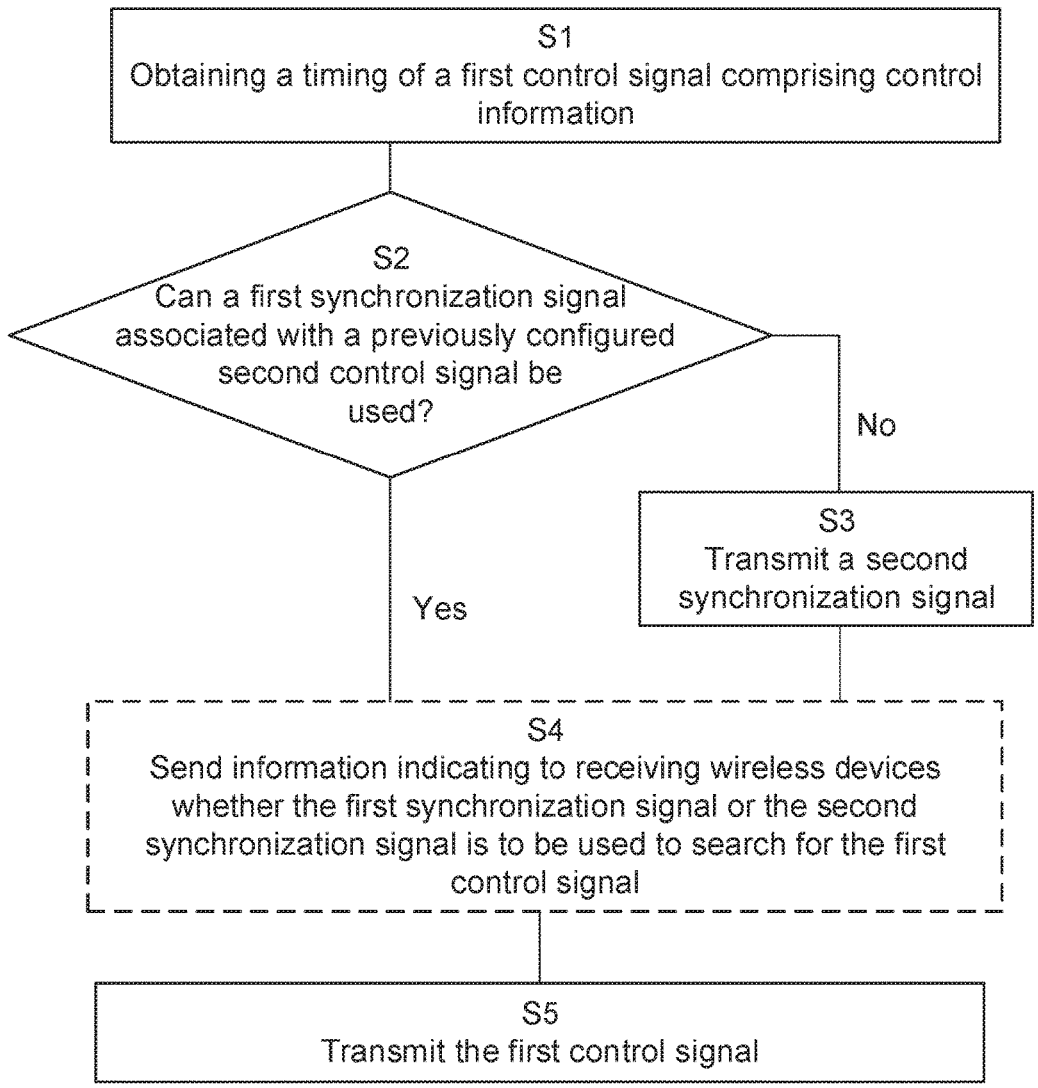
FIG. 3 is a flowchart illustrating method steps performed in a network node according to the proposed technique.

FIG. 3 illustrates a method, performed in a network node, for transmitting control information for supporting system access or system monitoring. Control information for supporting system access or system monitoring is e.g. dormant-mode operation information, tracking area information, paging information and random access response information. In general it refers to any information supporting system access or system monitoring. For example it refers to system information that was traditionally included in the System Information Block, SIB, or to other information related to system access or system monitoring.

The method comprises, obtaining S1 a timing of a first control signal comprising the control information. According to some aspects, the first control signal is any one of a tracking area signal, wherein the control information is tracking area information. In a particular example, the control information is tracking area identification and payload. Alternatively, the first control signal is a paging request or a random access response or any other control signal where the proposed methods are applicable.

The timing information defines points in time where a synchronisation sequence is transmitted. For example it defines in which frames the first control signal is transmitted e.g. a System Frame Number. The timing information might also define a time interval, within which the first control signal should be transmitted.

The method then comprises, evaluating S2 whether a first synchronization signal associated with a previously configured second control signal can also be used to provide synchronization between a receiving wireless device and the network node at reception of the control information. As discussed above coarse symbol timing and frequency synchronization is required to receive the first control signal. In some scenarios there are already signals configured that could possibly be used for this purpose. Hence, the purpose of the evaluation is to find out if there is such a signal. The prerequisite for using another synchronization signal is typically that it is transmitted close in time with regards to the signal that shall use it for synchronization support. Hence, according to some aspects, the evaluating S2 comprises evaluating whether a distance in time between transmission of the previously configured second control signal and transmission of the first control signal is below a predefined value. The first synchronization signal also need to support symbol timing and frequency synchronization requirements of the first control signal.

If there is a suitable synchronization signal which is already configured, then that signal is used for synchronization. However, if not, a new signal is configured. Thus, the method further comprises, when the evaluation S2 is negative then, transmitting S3 a second synchronization signal configured to provide synchronization between a receiving wireless device and the network node at reception of the first control signal.

According to some aspects, the previously configured second control signal carries system information. An example of a signal design supporting coarse symbol timing and frequency synchronization is the SS design for SSI transmission, where transmitting signals for synchronization constitutes a non-negligible overhead. To avoid duplicating this overhead in yet another signal, Tracking Area Signal Index, TRASI, reception can use the SS (associated with the SSI) for the purposes of synchronization in deployments where SSI and Tracking Area Signal, TRAS are transmitted from the same nodes and are configured with suitable periods, such that a 551 transmission will precede, immediately or with a small enough time gap, each TRAS transmission. Hence, in such scenarios, the TRAS will consist of only the TRASI. In other deployments where the SSI is not available for synchronization prior to reading TRASI, a separate synchronization signal (Tracking RAN Area Synchronization Signal, TRASS) is introduced for that purpose. In that case, the TRASS may be transmitted either at all TRASI transmission occasions or only at occasions where no matching SSI is available.

Figure 4A:
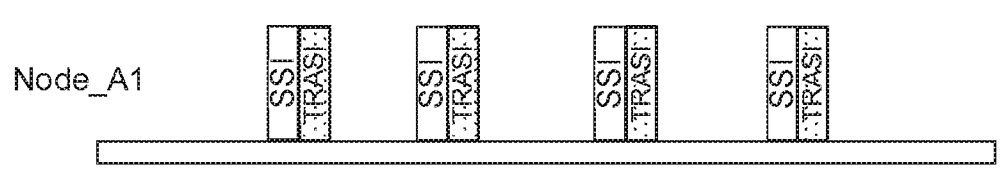
FIGS. 4a to 4c depict some possible Tracking RAN Area Signal, TRAS/System Signature Index, SSI, relationships and the corresponding choices of the associated synchronization signal field.
Figure 4B:
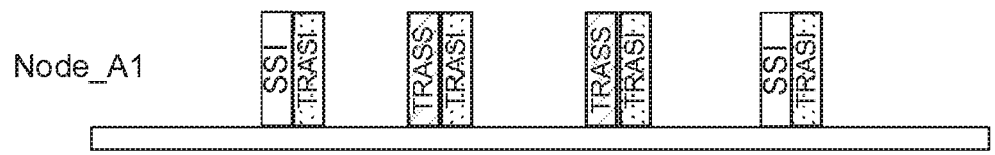
Figure 4C:
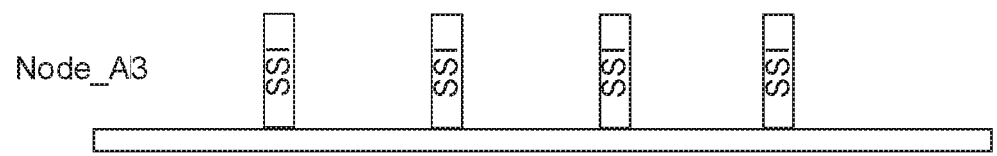
Figure 4C:
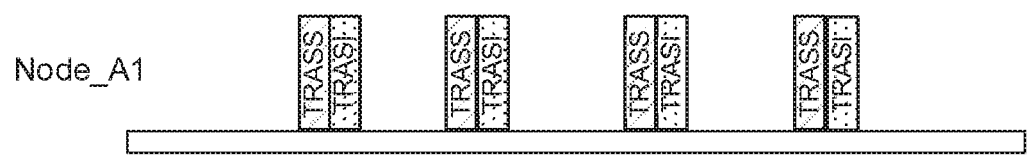

Some possible TRASI/SSI relationships and the corresponding choices of the associated synchronization signal field are depicted in FIGS. 4a to 4c.

FIG. 4a illustrates transmission of SSI from the same node that is transmitting the Tracking Area Signal, TRAS node. In this example the SSI period is also equal (and aligned) to TRA period. Hence, no TRASS needs to be transmitted, but the SS can be used for synchronization support at TRAS reception.

Note that a similar mix of TRASS+TRASI and only TRASI transmissions may result from scenarios where the TRAS period is longer than the SSI period, but the TRAS period is not a multiple of the SSI period, which means that the time distance between a TRAS transmission and the preceding SSI transmission will vary for each TRAS transmission. This is illustrated in FIG. 4b, where the TRASI is transmitted more often than the SSI. Hence, in 2 out of three TRASI transmissions a dedicated TRASS needs to be transmitted.

In other scenarios no SSI is transmitted from the node transmitting the TRAS i.e. TRA node. Then the TRASS need to be transmitted with every TRASI as shown in FIG. 4c, where SSI and TRASI are transmitted from different nodes referred to as A1 and A3.

Note that the opportunistic use of SSI for TRA synchronization implies neither a logical coupling between the two nor the requirement to transmit a SSI that matches the TRA.

According to some aspects, the second synchronization signal is dedicated for synchronization of the first control signal. For example it is exclusively provided to provide synchronization support for TRASI. It might of course not be prevented that the second synchronization signal is used for other purposes. However, dedicated implies that after the second synchronization signal, the first control signal is always transmitted, unless some unexpected interrupt has occurred. This means that a wireless device that receives a second synchronization signal should expect to find a first control signal in conjunction with it. The Synchronization Signal, SS, design (associated with SSI) has been optimized to provide wireless device synchronization. Since the synchronization requirements for TRA detection, not least the link quality operating point for the wireless device and the required ability to read the downlink payload information, are similar, the SS physical channel design is according to some aspects reused, and one, or a small number, of the PSS+SSS sequence combinations in SS are reserved to be used as the TRA synchronization signal. The TRASS can consist of a single predetermined sequence, or a small number of them, since it does not itself encode any TRA index information. In other words, according to some aspects, the first synchronization signal and the second synchronization signal are selected from a set comprising a number of constituent sequences, wherein a subset of the sequences are reserved for the second synchronization signal and are exclusively used for synchronization of the first control signal. The general requirement of this set of sequences is that a receiving mobile device needs to be able to detect any one of the sequences in the set of constituent sequences and determine, with some certainty, which sequence it is. For the wireless device, this design allows reusing the SS detection procedure for TRA synchronization. Hence, the wireless device does not necessarily need to know whether it is the SS or TRASS signal that serves as the synchronization component for TRAS.

According to some aspects, the method comprises sending S4 information indicating to receiving wireless devices whether the first synchronization signal or the second synchronization signal is to be used to search for the first control signal. The information indicates e.g. the first control signal is sent, such that a receiving wireless device knows when to search for the first control signal. The information might also indicate which of the sequences from a set of synchronization signal sequences that are associated with the first control signal.

In other words, sometimes the network indicates to the wireless device, via e.g. AIT or via dedicated signalling while the UE is in the active mode, which signal or signals should be used for the TRASI detection. In other embodiments, such an indication may be omitted. A receiving wireless device would then need to blindly search for the TRASI, as will be further explained in relation to the implementation of the proposed methods in a wireless device below.

Finally the method comprises transmitting S5 the first control signal. Hence, first control signal is transmitted by the network node within a time period after the synchronization sequence that should support synchronization at the receiver side. The TRA information will typically be transmitted as coded information payload (TRAS Index (TRASI)) with associated reference symbols to be used as phase reference. Traditional demodulation and decoding is then used by the wireless device to extract the information. In other words, according to some aspects, the transmitting S5 of the first control signal comprises transmitting the first control signal and an associated phase reference signal.

Example Node Operations in a Wireless Device

A corresponding method, performed in a wireless device for supporting system access or system monitoring from a network node, will now be described referring to FIG. 5a. Hence, the method is performed in a wireless device that receives a control signal transmitted by a network node and comprising control information, as described in relation to FIG. 3.

In other words, the method performed in a wireless device comprises receiving S11 a synchronization signal transmitted by the network node. The synchronization signal comprises one sequence from a set of synchronization signal sequences, wherein a subset of the synchronization signal sequences are reserved for synchronization of a first control signal and are exclusively used for synchronization of a first control signal. The receiving herein refers to capturing and digital processing (e.g. AD conversion, demodulation, decoding etc.) of a radio signal in accordance with common techniques.

The disclosure proposes that two or more different synchronization signals e.g. TRASI, SSI can be used to provide synchronization support for a first control signal. Hence, according to some aspects, at least one of the synchronization signals is associated with another (second) control signal and one synchronization signal is dedicated to the first control signals.

Each of the synchronization signals uses one or several symbol sequences. The sequences used by the first and the second synchronization signals are referred to as a set of synchronization signal sequences. A receiving wireless device needs to be able to separate the symbol sequences in the set of synchronization signal sequences from each other. The receiving wireless device can thus with some certainty determine which sequence it has received. Hence, the sequences need to be "sufficiently orthogonal" or "sufficiently different" for a wireless device to be able to identify the different sequences.

This will be further explained using the SSI as an example. If the synchronization requirements for TRA detection, not least the link quality operating point for the wireless device and the required ability read the downlink payload information, are similar, the SS physical channel design is reused and one, or a small number, of the PSS+SSS sequence combinations in SS are reserved to be used as the TRA synchronization signal. The TRASS can consist of a single predetermined sequence, or a small number of them, since it does not itself encode any TRA index information.

Since the TRASS field has the same structure as SS, the wireless device uses its standard SS search/synchronization procedure to obtain synchronization for TRASI reception regardless of which signal is transmitted for the synchronization purposes. The basic detection sequence consists of detecting a synchronization signal that could be associated with TRASI and detecting and decoding TRASI based on the timing and frequency synchronization settings.

For the wireless device, this design allows reusing the SS detection procedure for TRA synchronization. The wireless device does not need to know whether it is the SS or TRASS signal that serves as the synchronization component for TRAS.

The method further comprises detecting S12 one reference sequence from the set of synchronization signal sequences, in the received synchronization signal. Hence, wireless device searches for one or several reference synchronization sequences in the received signal. The searched reference synchronization sequence or sequences are associated with the first control signal. When a correlation between the received signal and a searched reference sequence is above a threshold or value the detection is considered successful. In other words, then a match is found. This is typically done by applying a matched filter. Hence, according to some aspects, the detection S12 is considered successful if the correlation between the received signal and the reference sequence is above a threshold.

The method further comprises receiving S13, upon successful detection, the first control signal transmitted by the network node, using the received synchronization signal to provide synchronization between the wireless device and the network node. According to some aspects, the first control signal is any one of, a tracking area signal, a paging signal and a random access response signal, as discussed above. Hence, the first control signal is according to some embodiments a control signal defined by system information or related thereto. The wireless device typically attempts to receive S13 the first control signal transmitted by the network node within a time period after the detecting the reference synchronization sequence. This might be done in different ways as will now be further explained.

The wireless device can test TRASI reception using any detected TRASS and SS synchronization, and it find out by trial and error which one of them is associated with TRASI.

However, if the wireless device has been configured to always use TRASS (or SSI) then only the configured signal is searched and the wireless device saves some computation resources for search processing.

In some scenarios the wireless device can retrieve information regarding whether the first control signal uses an already configured synchronization signal for synchronization support. Hence, according to some aspects, the method comprises determining S115 whether another sequence from the set of synchronization signal sequences associated with a previously configured second control signal can also be used to provide synchronization for reception of the first control signal. In such case, the receiving S13 of the first control signal uses the other synchronization signal to achieve synchronization between the wireless device and the network node.

The network could indicate to the wireless device when e.g. in which sub frames, or how often e.g. periodicity, TRASI is transmitted. Hence, according to some aspects, the method comprises, receiving S10a, from the network node, information indicating when to search for the first control signal. The wireless device, might then know when to try to detect a TRASI after a SSI. For example it tries to detect TRASI or SSI after every second SSI.

The network could also indicate to the wireless device, via e.g. AIT, which signal or signals should be used for the TRASI detection. According to some aspects, the method comprises, receiving S1ob, from the network node, information indicating one or more sequences, from the set of synchronization signal sequences, being associated with the first control signal, and wherein the detecting S12 is performed for the one of the indicated sequences. Hence, reference sequences being associated with the first control signal are identified.

The determining S115 regarding whether the sequence from the set of synchronization signal sequences can be used comprises blind detection of the other (second) synchronization signal and/or the first control signal. This will be explained with some examples.

Figure 5A:
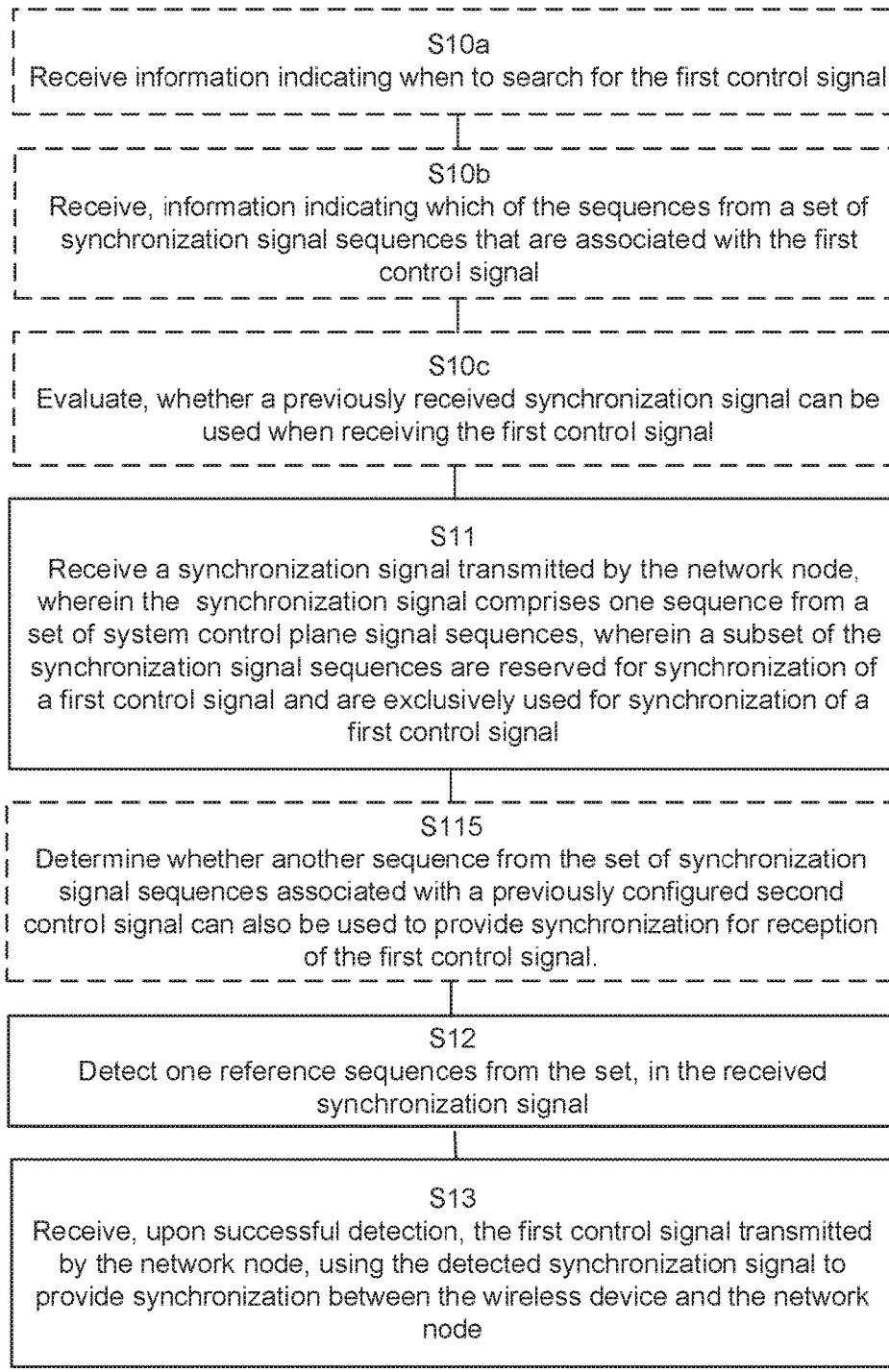
FIG. 5a is a flowchart illustrating method steps performed in a wireless device according to the proposed technique.
Figure 5B:
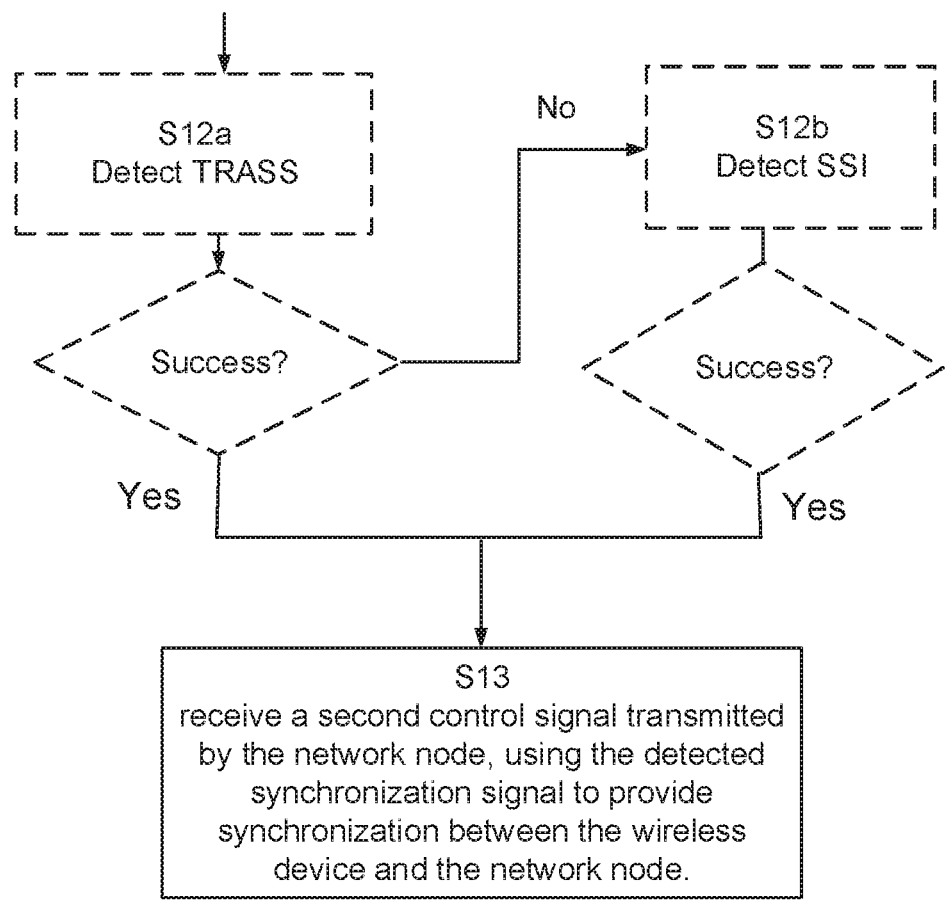
FIGS. 5b and 5c illustrate some aspects of the method in FIG. 5a in more detail.
Figure 5C:
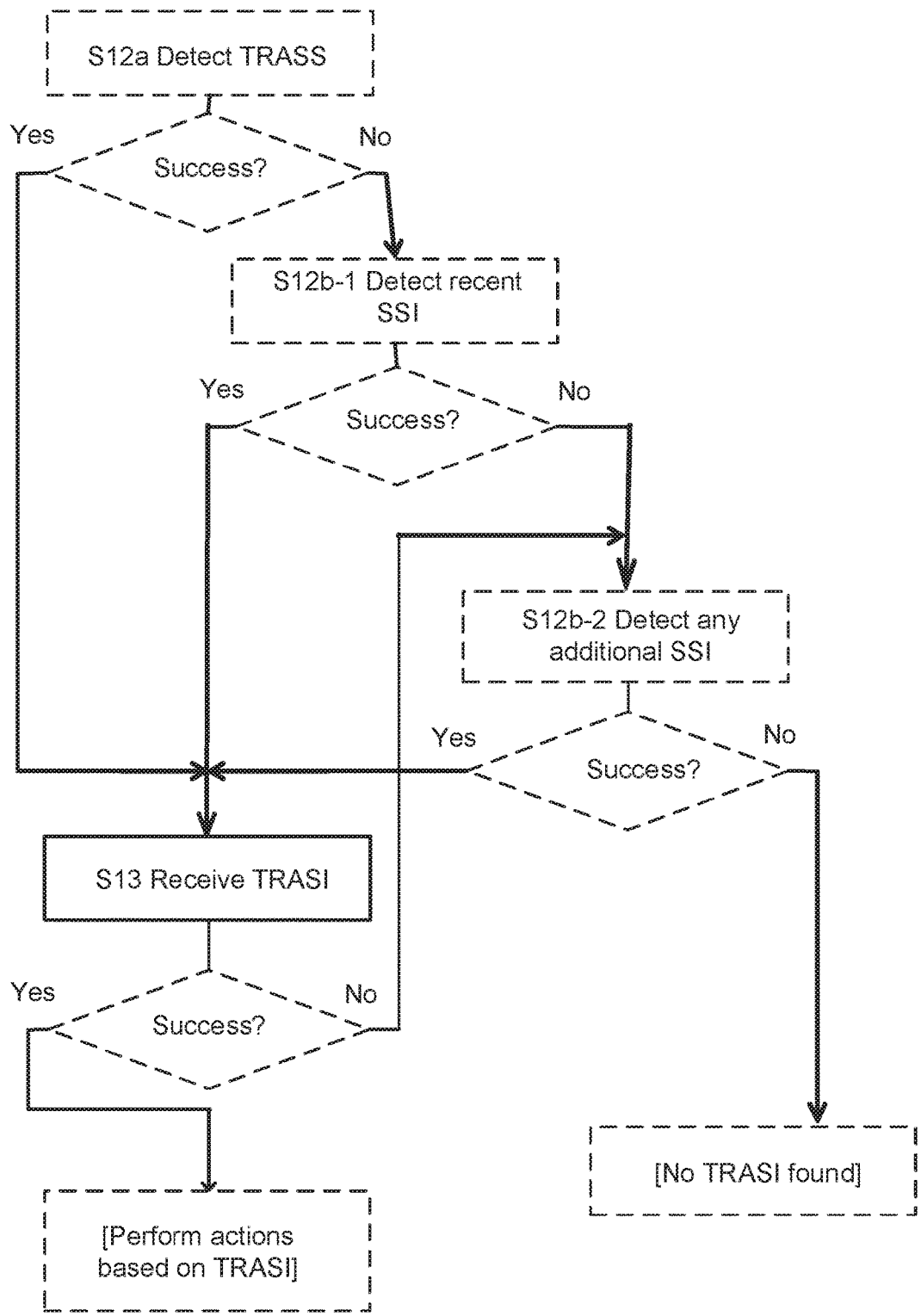

FIGS. 5b and 5c illustrate some aspects of the method in FIG. 5a in more detail.

FIG. 5b illustrates one example implementation of how detection of TRASI might be implemented in a system where both TRASS and SSI might be used for TRASI synchronization. In the example of FIG. 5b embodiment, the wireless device first attempts to detect TRASS, step S12a. In other words, the detecting S12 comprises attempting to detect the sequences reserved for synchronization of a first control signal S12a before attempting to detect the other synchronization signal sequences in the set S12b.

If it is detected i.e. Success—YES, the wireless device proceeds to detect TRASI with associated time/frequency synchronization settings. Because in this example the TRASS is exclusively used for supporting synchronization of TRASI, no further synchronization signals need to be detected, as there is always a TRASI transmitted after the TRASS. Hence, to minimize the number of sequences to search for it might be beneficial to start with the ones dedicated to the first control signal. In other words, when detection of one of the sequences reserved for synchronization S12a of the first control signal is successful, then not performing any further detection attempts.

If TRASS is not detected i.e. Success—NO, the wireless device attempts to detect one or more SSIs. If any SSI is found, one or more of them may be used to attempt TRASI detection. In other words, when detection S12 of any of the sequences reserved for synchronization of the first control signal S12a is unsuccessful then attempting to detect S12b one of the other sequences from the set of synchronization signal sequences. If it is detected i.e. Success YES, the wireless device proceeds to detect TRASI with associated time/frequency synchronization settings obtained by detecting SSI.

Another example of how detection of TRASI might be implemented in a system where both TRASS and SSI might be used for TRASI synchronization will now be described referring to FIG. 5c. This examples shows that the TRA synchronization search complexity may be further reduced by limiting the initial SSI search (if TRASS is not present) to the recently detected SSI signature(s).

An example flow diagram for such an embodiment of TRAS detection at the wireless device is shown in FIG. 5c. Other feasible implementations also exist.

The general concept comprises; 1) Look for TRASS S12a 2) If TRASS not found (Detected-NO), look for most recent SSI (step S12b-1) and 3) If same SSI not found (Success-NO), continue to full SSI search (step S12b-2). Referring to the methods described above, this means that the attempting S12b comprises attempting to detect the most recently detected synchronization signal sequence or sequences before attempting to detect any other sequences.

This approach minimizes the wireless device computational effort regarding the number of synchronization sequence candidates to be tested. In some implementations where the wireless device performs detection on-line, as the data is received, and does not record the sample sequence in advance of the computation, there may be a missed a page in cases where the SSI or TRA configuration has changed since the last wake-up. If the received samples over an observation window are recorded, the search window may be gradually adjusted to search or additional signals and missing any pages is avoided.

Sometimes it might be a completely blind detection. Hence, the wireless device might detect the TRASS or the recent SSI but it might fail to detect a subsequent TRASI. Then the wireless device searches for another synchronization signal and makes a new attempt. Stated differently, referring again to FIG. 5c, when the receiving S13 of the first control signal (e.g. after detection of TRASS and/or after detection of recent SSI) is unsuccessful then the wireless device detects S12b one of the other sequences from the set of synchronization signal sequences and attempts to receive S13 the first control signal within a time period after the other sequence.

In some wireless device implementations, the time duration when radio parts of the receiver are active is the major energy consumption factor, in which case the full search may always be performed and missing the pages is avoided.

In one embodiment, the wireless device may first look for a synchronization signal signature (including both TRASS and SSI) associated with the most recent successfully TRASI detection during the previous TRAS reception instances.

If no TRASS is present but several SSIs are audible, the wireless device may attempt immediate TRASI reception at all found SSI and/or TRASS timings, one of which will succeed. All SSIs are detected and corresponding TRASI detection is attempted during the same awake period, so no RF overhead is introduced (but possibly some processing overhead).

In case the network configures the wireless device to use TRASS for the TRASI detection, the wireless device, as a general rule, would only look for TRASS. In exceptional cases errors), the wireless device could still look for the SSI.

If inter-node timing synchronization accuracy is within the cyclic prefix, including the propagation delays due to the inter-site distance, a wireless device with a short DRX can read TRASI without a further synchronization operation. This assumes that wireless device's internal clock is stable enough to remain in synchronization for the duration of a DRX sleep period and that this synchronization will be good enough for reading the TRASI even if it is transmitted from a node that differs from the one where the synchronization was achieved. Whether this condition is fulfilled can be previously verified by testing the presence of TRASS/SSI at the known timing. In other words, according to some aspects, the method comprises, evaluating S10c, whether synchronization achieved by a previously received synchronization signal can be used when receiving the first control signal and wherein the receiving S11 and detecting S12 are performed when evaluation is negative.

In some cases, a "loose" synchronization within a TRA is provided, allowing timing misalignment that is limited but exceeds the cyclic prefix, preferably with a known tolerance. A wireless device will then search for TRAS-related time synchronization over a limited time range in the vicinity of the current timing, plus the worst-case timing drift due to wireless device internal clock drift during the DRX sleep period. The cost (in terms of energy consumption) for the wireless device due to receiver, RX, awake time is thus "proportional" to the inter-node timing uncertainty. RX awake time is the time during the RX circuitry (including RF) is turned on for reception (it is "awake" as opposed to asleep).

In scenarios where the TRAS transmission sometimes, but not always, is preceded by a regular SSI transmission, a possible option (in one embodiment) is to introduce an additional SSI transmission (i.e. in addition to the regular periodic SSI transmissions) to precede the TRAS transmission instead of using the TRASS to precede the TRAS transmissions where no preceding regular SSI transmission is available. This may serve to simplify the search procedure in the wireless device and in addition provides the wireless device with additional opportunities to be informed of the valid SSI.

The solution description targets the case of transmission of TRA information in 5G scenarios. Note, however, that the principle of flexible synchronization signal design for the TRAS transmission could also be applied to transmission of Tracking Area information, e.g. core network TAC, in 5G scenarios.

Even more generally, the proposed methods are applicable to any context where periodic signals need to be transmitted (and received by recently woken-up wireless devices) that in some cases coincide with a constantly transmitted synchronization field and in some cases do not. Examples of such context are paging and random access.

Paging is sent when the network needs to contact the wireless device in dormant mode, for different purposes. Paging Indication Channel, PICH, is transmitted using the standard control or data channel, containing dedicated resources for demodulation. Its reception requires prior coarse time and frequency downlink sync with regards to the node.

Figure 6A:
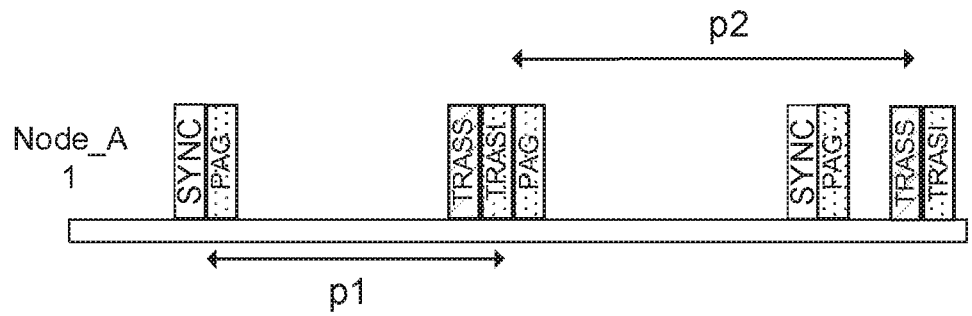
FIGS. 6a to 6d depict some possible alternative uses of the proposed methods.

One scenario is illustrated in FIG. 6a. If the paging occurs shortly after TRAS reception (i.e. TRASS+TRASI) and from the same node, the TRAS sync arrangement (i.e. TRASS) provides the downlink sync for paging reception. However, in some deployments, paging cycle p1 may be separate from TRAS cycle p2, in which case a separate preceding downlink sync signal (SYNC in FIG. 6a) from the node transmitting paging is sometimes needed before the paging message (PAG in FIG. 6a).

Figure 6B:

If in a given deployment, illustrated in FIG. 6b, paging does not occur shortly after TRAS another synchronization signal is needed. If SSI is transmitted from the responding in close proximity to the paging timing, it will be used, otherwise a separate sync, here denoted SYNC, is transmitted. Detection at the wireless device of which sync is relevant is the same as for the TRAS case. Hence, if SSI is transmitted from another node, a separate sync will always be required.

Figure 6C:
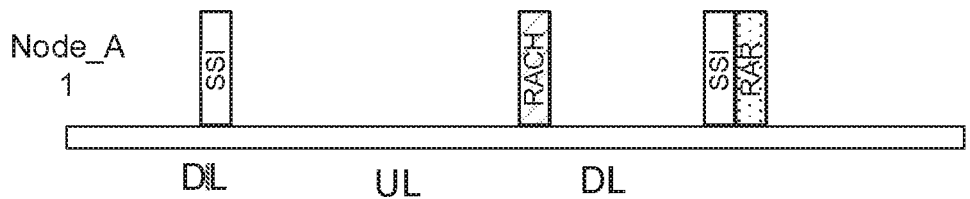
Figure 6D:
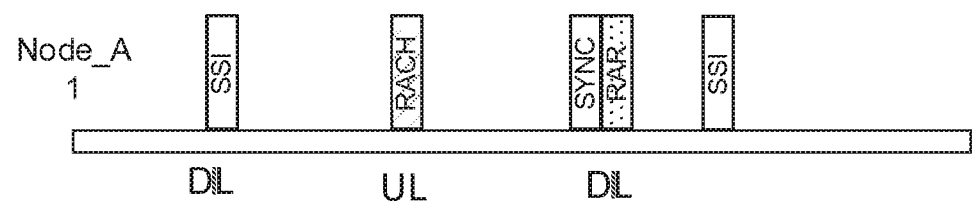

Random Access Response, RAR, is another signal that might use a similar principle for achieving synchronization. Random Access response is sent when a node has received a random access transmission from the wireless device (e.g. a Physical Random Access Channel, PRACH, preamble) and needs to signal to the wireless device that is available for establishing a connection. In the 5G concept, the RAR is sent using the standard control or data channel, containing dedicated RS for demodulation. Its reception requires prior coarse time and frequency downlink sync with regards to the node. Since the wireless device does not have that downlink sync, a preceding downlink sync signal from that node is needed. If in a given deployment, SSI is transmitted from the responding in close proximity to the RAR timing, it will be used, see FIG. 6c, otherwise a separate sync is transmitted, as shown in FIG. 6d. Detection at the wireless device of which sync is relevant is the same as for the TRAS case.

Example Implementations in a Network Mode

Figure 7:
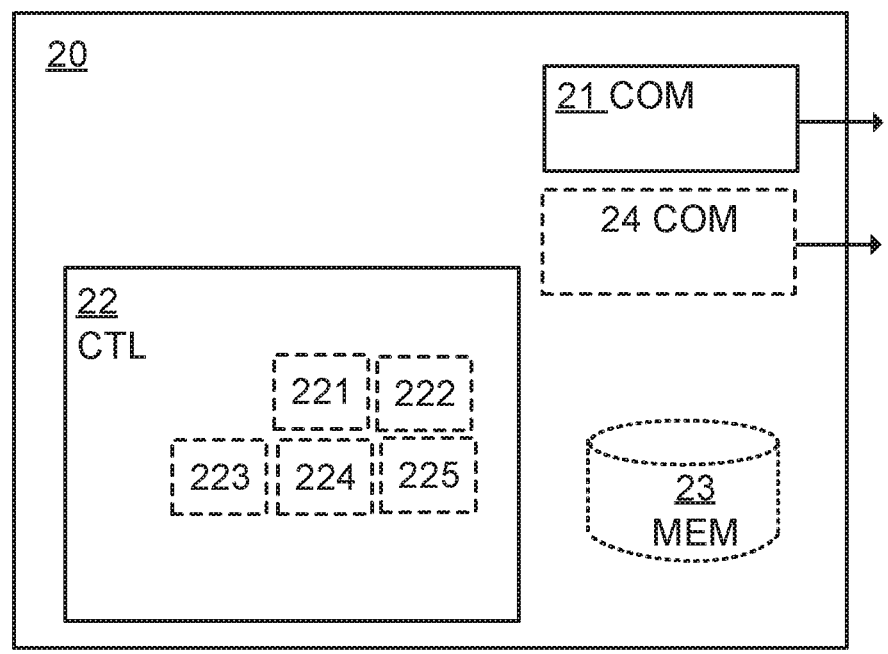
FIG. 7 is an example node configuration of a network node, according to some of the example embodiments.

Turning now to FIG. 7, a schematic diagram illustrating some modules of an example embodiment of a network node being configured for transmitting control information for supporting system access or system monitoring to a wireless device. The network node 20 is typically a radio network node or base station, such as an eNodeB in LTE, providing wireless access to wireless devices within one or more areas referred to as cells. The network node is configured to implement the methods described in relation to FIG. 3.

The network node 20 comprises a radio communication interface WO 21 configured for communication with wireless devices 10. The wireless communication interface 21 is arranged for wireless communication with other network nodes within range of the network node 20. The radio communication interface 21 is according to some aspects adapted to communicate over one or several radio access technologies. If several technologies are supported, the node typically comprises several communication interfaces, e.g. one WLAN or Bluetooth communication interface and one cellular communication interface.

As shown in FIG. 7, the network node 20 according to some aspects comprises a network communication interface 24. The network communication interface 24 is configured for communication with other network nodes e.g. in a core network. This communication is often wired e.g. using fibre. However, it may as well be wireless.

The network node 20 comprises a controller, CTL, or a processing circuitry 22 that is e.g. constituted by any suitable Central Processing Unit, CPU, microcontroller, Digital Signal Processor, DSP, etc. capable of executing computer program code. The computer program is according to some aspects stored in a memory, MEM 23. The memory 23 can be any combination of a Read And write Memory, RAM, and a Read Only Memory, ROM. The memory 23 is according to some aspects comprises persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program.

The processing circuitry 22 is configured to cause the network node 20 to obtain a timing of a first control signal comprising the control information; to evaluate whether a first synchronization signal associated with a previously configured second control signal can also be used to provide synchronization between the wireless device and the network node at reception of the first control signal; to, when the evaluation is negative, transmit a second synchronization signal configured to provide synchronization between the wireless device and the network node at reception of the first control signal, using the radio communication interface and to transmit the first control signal using the radio communication interface 21.

According to some aspects, the first control signal is any one of a tracking area signal, a paging signal and a random access response signal.

According to some aspects, the processing circuitry 22 is configured to cause the network node 20 to perform the evaluation by evaluating whether a distance in time between transmission of the previously configured second control signal and transmission of the first control signal is below a predefined value.

According to some aspects, the second synchronization signal is dedicated for synchronization of the first control signal.

According to some aspects, the first synchronization signal and the second synchronization signal are selected from a set comprising a number of constituent sequences, wherein a subset of the sequences are reserved for the second synchronization signal and are exclusively used for synchronization of the first control signal.

According to some aspects, the previously configured second control signal carries system information.

According to some aspects, the first control signal is a tracking area signal comprising tracking area identification and payload.

According to some aspects, the processing circuitry 22 is configured to cause the network node 20 to send information indicating to receiving wireless devices whether the first synchronization signal or the second synchronization signal is to be used to search for the first control signal.

According to some aspects, the processing circuitry 22 is configured to cause the network node 20 to transmit the first control signal by transmitting the first control signal and an associated phase reference signal.

According to some aspects the processing circuitry 22 or the network node 20 comprises modules configured to perform the methods described above. The modules are implemented in hardware or in software or in a combination thereof. The modules are according to one aspect implemented as a computer program stored in a memory 13 which run on the processing circuitry 12.

According to some aspects, the network node comprises an obtainer 221 configured to obtain a timing of a first control signal comprising the control information.

According to some aspects, the network node comprises a evaluator 222 configured to evaluate whether a first synchronization signal associated with a previously configured second control signal can also be used to provide synchronization between the wireless device and the network node at reception of the first control signal.

According to some aspects, the network node comprises a first transmitter module 223 configured to when the evaluation is negative, transmit a second synchronization signal configured to provide synchronization between the wireless device and the network node at reception of the first control signal, using the radio communication interface 21.

According to some aspects network node comprises an indicator 224 configured to send information indicating to receiving wireless devices whether the first synchronization signal or the second synchronization signal is to be used to search for the first control signal.

According to some aspects, the network node comprises a second transmitter module 225 configured to transmit the first control signal using the radio communication interface 21.

Example Implementation in a Wireless Device

Figure 8:
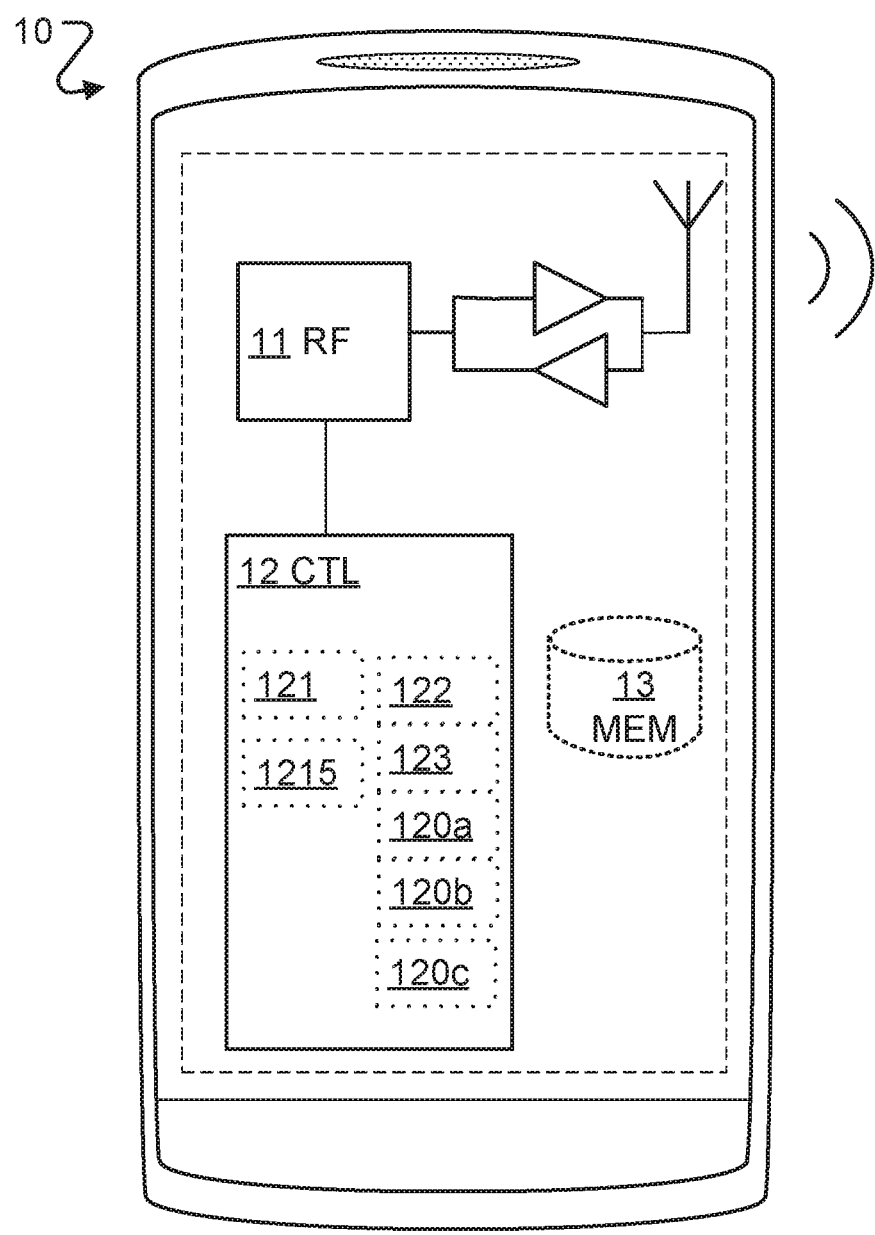
FIG. 8 is an example node configuration of a wireless device, according to some of the example embodiments.

FIG. 8 illustrates an example of a wireless device 10, which incorporates some of the example embodiments discussed above in relation to FIGS. 5a to 5c. FIG. 8 discloses a wireless device configured for receiving control information for supporting system access or system monitoring from a network node 20. The wireless device 10 is configured to implement the methods described above and below.

A "wireless device" as the term may be used herein, is to be broadly interpreted to include a radiotelephone having ability for internet/intranet access, web browser, organizer, calendar, a camera (e.g., video and/or still image camera), a sound recorder (e.g., a microphone), and/or Global Positioning System, GPS, receiver; a Personal Communications System, PCS, user equipment that according to some aspects combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc.

As shown in FIG. 8, the wireless device 10 comprises a radio communication interface or radio circuitry 11 configured to receive and transmit any form of communications or control signals within a network. It should be appreciated that the radio circuitry 11 is according to some aspects comprised as any number of transceiving, receiving, and/or transmitting units or circuitry. It should further be appreciated that the radio circuitry 11 is e.g. be in the form of any input/output communications port known in the art. The radio circuitry 11 e.g. comprises RF circuitry and baseband processing circuitry (not shown).

The wireless device 10 according to some aspects further comprises at least one memory unit or circuitry 13 that is in communication with the radio circuitry 11. The memory 13 is e.g. be configured to store received or transmitted data and/or executable program instructions. The memory 13 is e.g. configured to store any form of contextual data. The memory 13 is e.g. be any suitable type of computer readable memory and is e.g. be of volatile and/or non-volatile type The wireless device 10 further comprises processing circuitry 12 which configured to cause the wireless device to receive, using the radio communication interface 11, a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of the first control signal, to detect one reference sequences from the set of synchronization signal sequences, and to receive, upon successful detection, the first control signal transmitted by the network node, using the radio communication interface 21, and using the received synchronization signal to provide synchronization between the wireless device and the network node. The processing circuitry is further configured to perform any of the aspects of the methods performed in a wireless device described above.

The processing circuitry 12 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Read And write Memory, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a wireless device to execute the methods described above and below.

According to some aspects, a subset of the synchronization signals sequences are associated with a previously configured second control signal.

According to some aspects, the processing circuitry 12 is configured to cause the wireless device 10 to evaluate whether one of the sequences associated with a previously configured second control signal can also be used to provide synchronization for reception of the first control signal, and wherein, when the evaluation is successful, to receive of the first control signal uses the sequence associated with a previously configured second control signal to provide synchronization between the wireless device and the network node.

According to some aspects, the evaluation of whether a sequence associated with a previously configured second control signal can be used comprises blind detection of the sequence associated with a previously configured second control signal and/or of the first control signal.

According to some aspects, the first control signal is any one of; a tracking area signal, a paging signal and a random access response signal.

According to some aspects, the processing circuitry 12 is configured to cause the wireless device 10 to receive the first control signal transmitted by the network node within a time period after the detecting the synchronization sequence.

According to some aspects, the processing circuitry 12 is configured to cause the wireless device 10 to consider the detection successful if the correlation between the received signal and a sequence is above a threshold.

According to some aspects, the processing circuitry 12 is configured to cause the wireless device 10 to receive, from the network node, information indicating when to search for the first control signal.

According to some aspects, the processing circuitry 12 is configured to cause the wireless device 10 to receive, from the network node, information indicating one or more sequences, from the set of synchronization signal sequences, being associated with the first control signal, and wherein the detecting is using one of the indicated sequences for synchronization.

According to some aspects, the processing circuitry 12 is configured to cause the wireless device 10 to evaluate, whether synchronization achieved by a previously received synchronization signal can be used when receiving the first control signal and to receive and detect the synchronization signal when evaluation is negative.

According to some aspects, the processing circuitry 12 is configured to cause the wireless device 10 to detect one reference sequences from the set of synchronization signal sequences by attempting to detect the sequences reserved for synchronization of a first control signal before attempting to detect the other synchronization signal sequences in the set.

According to some aspects, processing circuitry 12 is configured to, when detection of one of the sequences reserved for synchronization of the first control signal is successful, then not performing any further detection attempts.

According to some aspects, the processing circuitry 12 is configured to, when detection of any of the sequences reserved for synchronization of the first control signal is unsuccessful then attempting to detect one of the other sequences from the set of synchronization signal sequences.

According to some aspects, the processing circuitry 12 is configured to, cause the wireless device 10 to attempt to detect one of the other sequences by attempting to detect the most recently detected synchronization signal sequence or sequences before attempting to detect any other sequences.

According to some aspects, the processing circuitry 12 is configured to, when the receiving of the first control signal is unsuccessful, cause the wireless device 10 to detect one of the other sequences from the set of synchronization signal sequences and receive the first control signal within a time period after the other sequence.

According to some aspects, the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises a first receiver module 121 configured to obtain to receive, using the radio communication interface 11, a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of the first control signal.

According to some aspects the wireless device 10 or the processing circuitry 12 comprises a determiner 1215 configured to determine whether another sequence from the set of synchronization signal sequences associated with a previously configured second control signal can also be used to provide synchronization for reception of the first control signal.

According to some aspects the wireless device 10 or the processing circuitry 12 comprises a detector 122 configured to detect one reference sequence from the set of synchronization signal sequences.

According to some aspects the wireless device 10 or the processing circuitry 12 comprises a second receiver module 123 configured to receive, upon successful detection, the first control signal transmitted by the network node, using the radio communication interface 21, and using the received synchronization signal to provide synchronization between the wireless device and the network node.

According to some aspects the wireless device 10 or the processing circuitry 12 comprises a first indication module 120a configured to receive information indicating when to search for the first control signal.

According to some aspects the wireless device 10 or the processing circuitry 12 comprises a second indication module 120b configured to receive, information indicating which of the sequences from a set of synchronization signal sequences that are associated with the first control signal.

According to some aspects the wireless device 10 or the processing circuitry 12 comprises an evaluator 120c configured to evaluate, whether a previously received synchronization signal can be used when receiving the first control signal.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which in one aspect are implemented by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a network node, for transmitting control information for supporting system access or system monitoring, the method comprising:
   obtaining a timing of a first control signal comprising the control information;
   evaluating whether a first synchronization signal associated with a previously configured second control signal can also be used to provide synchronization between a receiving wireless device and the network node at reception of the control information;
when the evaluation is negative then,
   transmitting a second synchronization signal configured to provide synchronization between a receiving wireless device and the network node at reception of the first control signal, and
   transmitting the first control signal.

2. The method of claim 1, wherein the first control signal is any one of:
   a tracking area signal,
   a paging signal and
   a random access response signal.

3. The method of claim 1, wherein the evaluating comprises evaluating whether a distance in time between transmission of the previously configured second control signal and transmission of the first control signal is below a predefined value.

4. The method of claim 1, wherein the second synchronization signal is dedicated for synchronization of the first control signal.

5. The method of claim 1, wherein the first synchronization signal and the second synchronization signal are selected from a set comprising a number of constituent sequences, wherein a subset of the sequences are reserved for the second synchronization signal and are exclusively used for synchronization of the first control signal.

6. The method of claim 1, wherein the previously configured second control signal carries system information.

7. The method of claim 1, wherein the first control signal is a tracking area signal comprising tracking area identification and payload.

8. The method of claim 1, comprising:
   sending information indicating to receiving wireless devices whether the first synchronization signal or the second synchronization signal is to be used to search for the first control signal.

9. The method of claim 1, wherein the transmitting of the first control signal comprises transmitting the first control signal and an associated phase reference signal.

10. A method, performed in a wireless device for receiving control information for supporting system access or system monitoring from a network node, the method comprising:
   receiving a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of a first control signal,
   detecting one reference sequence from the set of synchronization signal sequences, in the received synchronization signal and
   receiving, upon successful detection, the first control signal transmitted by the network node, using the received synchronization signal to provide synchronization between the wireless device and the network node.

11. The method of claim 10 wherein, wherein a subset of the synchronization signal sequences are associated with a previously configured second control signal.

12. The method of claim 10, comprising evaluating whether one of the sequences associated with a previously configured second control signal can also be used to provide synchronization for reception of the first control signal, and wherein, when the evaluation is successful, the receiving of the first control signal uses the sequence associated with a previously configured second control signal to provide synchronization between the wireless device and the network node.

13. The method of claim 12, wherein the evaluation whether sequence associated with a previously configured second control signal can be used comprises blind detection of the sequence associated with a previously configured second control signal and/or of the first control signal.

14. The method of claim 10, wherein the first control signal is any one of:
   a tracking area signal, wherein the control information is tracking area information;
   a paging signal; and
   a random access response signal.

15. The method of claim 10, wherein the receiving comprises receiving the first control signal transmitted by the network node within a time period after the detecting the synchronization sequence.

16. The method of claim 10, wherein the detection is considered successful if the correlation between the received signal and the reference sequence is above a threshold.

17. The method of claim 10, comprising:
   receiving, from the network node, information indicating when to search for the first control signal.

18. The method of claim 10, comprising:
   receiving, from the network node, information indicating one or more sequences, from the set of synchronization signal sequences, being associated with the first control signal, and wherein the detecting is using one of the indicated sequences for synchronisation.

19. The method of claim 10, comprising:
   evaluating, whether synchronization achieved by a previously received synchronization signal can be used when receiving the first control signal and wherein the receiving and detecting are performed when evaluation is negative.

20. The method of claim 10, wherein the detecting comprises attempting to detect the sequences reserved for synchronization of a first control signal before attempting to detect the other synchronization signal sequences in the set.

21. The method of claim 20, wherein when detection of one of the sequences reserved for synchronization of the first control signal is successful, then not performing any further detection attempts.

22. The method of claim 20, wherein when detection of any of the sequences reserved for synchronization of the first control signal is unsuccessful then:
attempting to detect one of the other sequences from the set of synchronization signal sequences.

23. The method of claim 10, wherein the attempting comprises attempting to detect the most recently detected synchronization signal sequence or sequences before attempting to detect any other sequences.

24. The method of claim 10, wherein when the receiving of the first control signal is unsuccessful then:
detecting one of the other sequences from the set of synchronization signal sequences and receiving the first control signal within a time period after the other sequence.

25. A network node, in a communication system, the network node being configured for transmitting control information for supporting system access or system monitoring to a wireless device, the network node comprising:
a radio communication interface radio circuitry configured for communication with the wireless device; and
processing circuitry configured to cause the network node:
to obtain a timing of a first control signal comprising the control information;
to evaluate whether a first synchronization signal associated with a previously configured second control signal can also be used to provide synchronization between the wireless device and the network node at reception of the first control signal;
to, when the evaluation is negative, transmit a second synchronization signal configured to provide synchronization between the wireless device and the network node at reception of the first control signal, using the radio communication interface and
to transmit the first control signal using the radio communication interface.

26. The network node of claim 25, wherein the first control signal is any one of:
a tracking area signal,
a paging signal and
a random access response signal.

27. The network node of claim 25, wherein the processing circuitry is configured to perform the evaluation by evaluating whether a distance in time between transmission of the previously configured second control signal and transmission of the first control signal is below a predefined value.

28. The network node of claim 25, wherein the second synchronization signal is dedicated for synchronization of the first control signal.

29. The network node of claim 25, wherein the first synchronization signal and the second synchronization signal are selected from a set comprising a number of constituent sequences, wherein a subset of the sequences are reserved for the second synchronization signal and are exclusively used for synchronization of the first control signal.

30. The network node of claim 25, wherein the previously configured second control signal carries system information.

31. A network node of claim 25, wherein the first control signal is a tracking area signal comprising tracking area identification and payload.

32. A network node of claim 25, wherein the processing circuitry is configured to send information indicating to receiving wireless devices whether the first synchronization signal or the second synchronization signal is to be used to search for the first control signal.

33. A network node of claim 25, wherein the processing circuitry is configured to transmit the first control signal by transmitting the first control signal and an associated phase reference signal.

34. A wireless device configured for receiving control information for supporting system access or system monitoring from a network node, the wireless device comprising:
a radio communication interface configured to communicate with the network node; and
processing circuitry configured to cause the wireless device:
to receive, using the radio communication interface, a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of the first control signal,
detect one reference sequences from the set of synchronization signal sequences, and
receive, upon successful detection, the first control signal transmitted by the network node, using the radio communication interface, and using the received synchronization signal to provide synchronization between the wireless device and the network node.

35. The wireless device of claim 34, wherein a subset of the synchronization signal sequences is associated with a previously configured second control signal.

36. The wireless device of claim 34, wherein the processing circuitry is configured to evaluate whether one of the sequences associated with a previously configured second control signal can also be used to provide synchronization for reception of the first control signal, and wherein, when the evaluation is successful, to receive of the first control signal uses the sequence associated with a previously configured second control signal to provide synchronization between the wireless device and the network node.

37. The wireless device of claim 36, wherein the evaluation of whether a sequence associated with a previously configured second control signal can be used comprises blind detection of the sequence associated with a previously configured second control signal and/or of the first control signal.

38. The wireless device of claim 34, wherein the first control signal is any one of; a tracking area signal, a paging signal and a random access response signal.

39. The method of claim 34, wherein the processing circuitry is configured to receive the first control signal transmitted by the network node within a time period after the detecting the synchronization sequence.

40. The method of claim 34, wherein the processing circuitry is configured to consider the detection successful if the correlation between the received signal and a sequence is above a threshold.

41. The method of claim 34, wherein the processing circuitry is configured to receive, from the network node, information indicating when to search for the first control signal.

42. The method of claim 34, wherein the processing circuitry is configured to receive, from the network node, information indicating one or more sequences, from the set of synchronization signal sequences, being associated with the first control signal, and wherein the detecting is using one of the indicated sequences for synchronisation.

43. The method of claim 34, wherein the processing circuitry is configured to evaluate, whether synchronization achieved by a previously received synchronization signal can be used when receiving the first control signal and to receive and detect the synchronization signal when evaluation is negative.

44. The method of claim 34, wherein the processing circuitry is configured to detect the reference sequence from the set of synchronization signal sequences by attempting to detect the sequences reserved for synchronization of a first control signal before attempting to detect the other synchronization signal sequences in the set.

45. The method of claim 44, wherein the processing circuitry is configured to, when detection of one of the sequences reserved for synchronization of the first control signal is successful, then not performing any further detection attempts.

46. The method of claim 44, wherein the processing circuitry is configured to, when detection of any of the sequences reserved for synchronization of the first control signal is unsuccessful, then attempting to detect one of the other sequences from the set of synchronization signal sequences.

47. The method of claim 34, wherein the processing circuitry is configured to, attempt to detect one of the other sequences by attempting to detect the most recently detected synchronization signal sequence or sequences before attempting to detect any other sequences.

48. The method of claim 34, wherein the processing circuitry is configured to, when the receiving of the first control signal is unsuccessful, then detect one of the other sequences from the set of synchronization signal sequences and receive the first control signal within a time period after the other sequence.

49. A nontransitory computer readable storage medium comprising computer program code which, when executed by a network node, causes the network node to execute a method for transmitting control information for supporting system access or system monitoring, the method comprising:

obtaining a timing of a first control signal comprising the control information;

evaluating whether a first synchronization signal associated with a previously configured second control signal can also be used to provide synchronization between a receiving wireless device and the network node at reception of the control information; when the evaluation is negative then, transmitting a second synchronization signal configured to provide synchronization between a receiving wireless device and the network node at reception of the first control signal, and transmitting the first control signal.

50. A nontransitory computer readable storage medium comprising computer program code which, when executed by a wireless device, causes the wireless device to execute a method for receiving control information for supporting system access or system monitoring from a network node, the method comprising:

receiving a synchronization signal transmitted by the network node, wherein the synchronization signal comprises one sequence from a set of synchronization signal sequences, wherein a subset of the synchronization signal sequences are reserved for synchronization of a first control signal and are exclusively used for synchronization of a first control signal, detecting one reference sequence from the set of synchronization signal sequences, in the received synchronization signal and receiving, upon successful detection, the first control signal transmitted by the network node, using the received synchronization signal to provide synchronization between the wireless device and the network node.

* * * * *